United States Patent [19]

Youngers

[11] 4,281,848

[45] Aug. 4, 1981

[54] JOINT FOR ARTICULATED VEHICLES

[75] Inventor: Stephen A. Youngers, Clearwater, Kans.

[73] Assignee: J. I. Case Company, Racine, Wis.

[21] Appl. No.: 83,687

[22] Filed: Oct. 11, 1979

[51] Int. Cl.³ .................................................. B60D 1/00
[52] U.S. Cl. ........................................ 280/494; 280/400; 308/72; 403/56; 403/58; 403/59
[58] Field of Search ......................... 280/461 A, 400, 492, 280/494, 109, 483, 484, 485, 486; 403/56, 61, 57, 62, 58, 63, 59, 82, 287; 308/72, 140, 141; 180/134, 135, 136, 137, 138, 139

[56] References Cited

U.S. PATENT DOCUMENTS

| 2,127,689 | 8/1938 | Johnson | 280/484 |
| 3,038,619 | 6/1962 | Wagner | 414/711 |
| 3,901,566 | 8/1975 | Riegler et al. | 308/72 X |
| 3,912,300 | 10/1975 | Bryan | 280/492 X |
| 4,154,456 | 5/1979 | Jensen et al. | 280/494 |

Primary Examiner—Joseph F. Peters, Jr.
Assistant Examiner—Randall A. Schrecengost
Attorney, Agent, or Firm—Dressler, Goldsmith, Shore, Sutker & Milnamow, Ltd.

[57] ABSTRACT

An articulated joint for an articulated vehicle. Upper and lower pivotal connections, each employing a ball and socket, allow pivoting of two vehicle sections about a vertical axis. The ball of the lower joint is attached to one section while the socket is attached to the other section of the vehicle. The socket and ball of the upper joint are attached to a support member free to move along a shaft in a transverse direction between two stops. The ball of the upper joint is free to move along a vertical shaft joined to the other section of the vehicle. The transverse shaft provides a bearing surface to transmit loads between the two vehicle sections. Seals along the support member prevent entrainment of dirt along the shaft and bearing. The stops are part of the structure attaching the transverse shaft to the vehicle.

4 Claims, 3 Drawing Figures

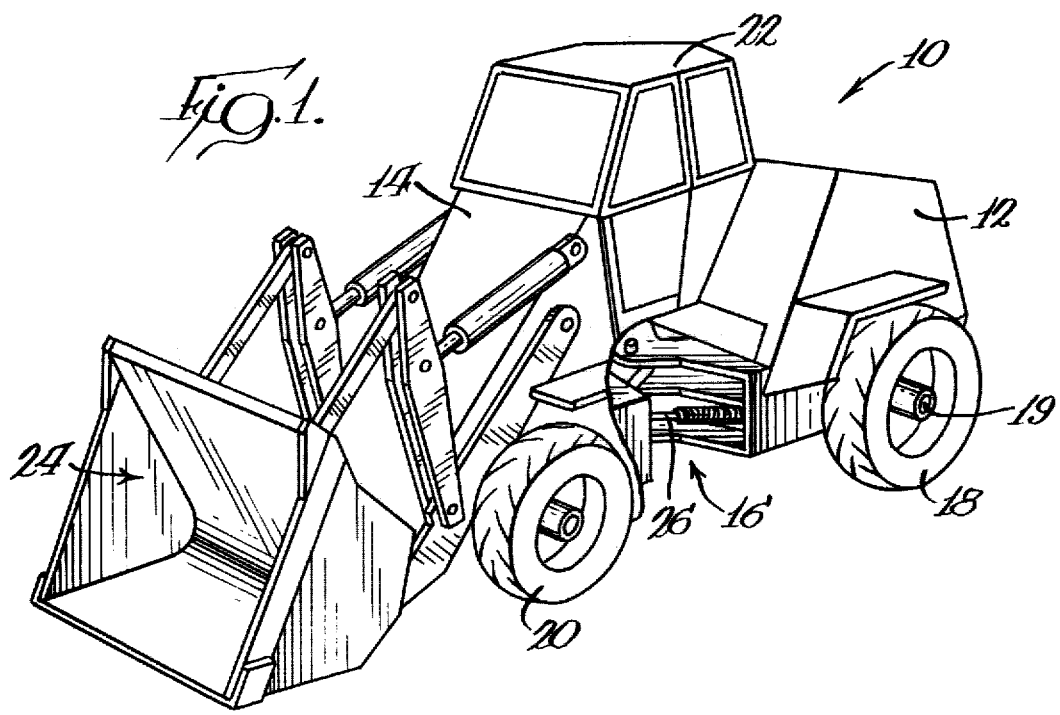
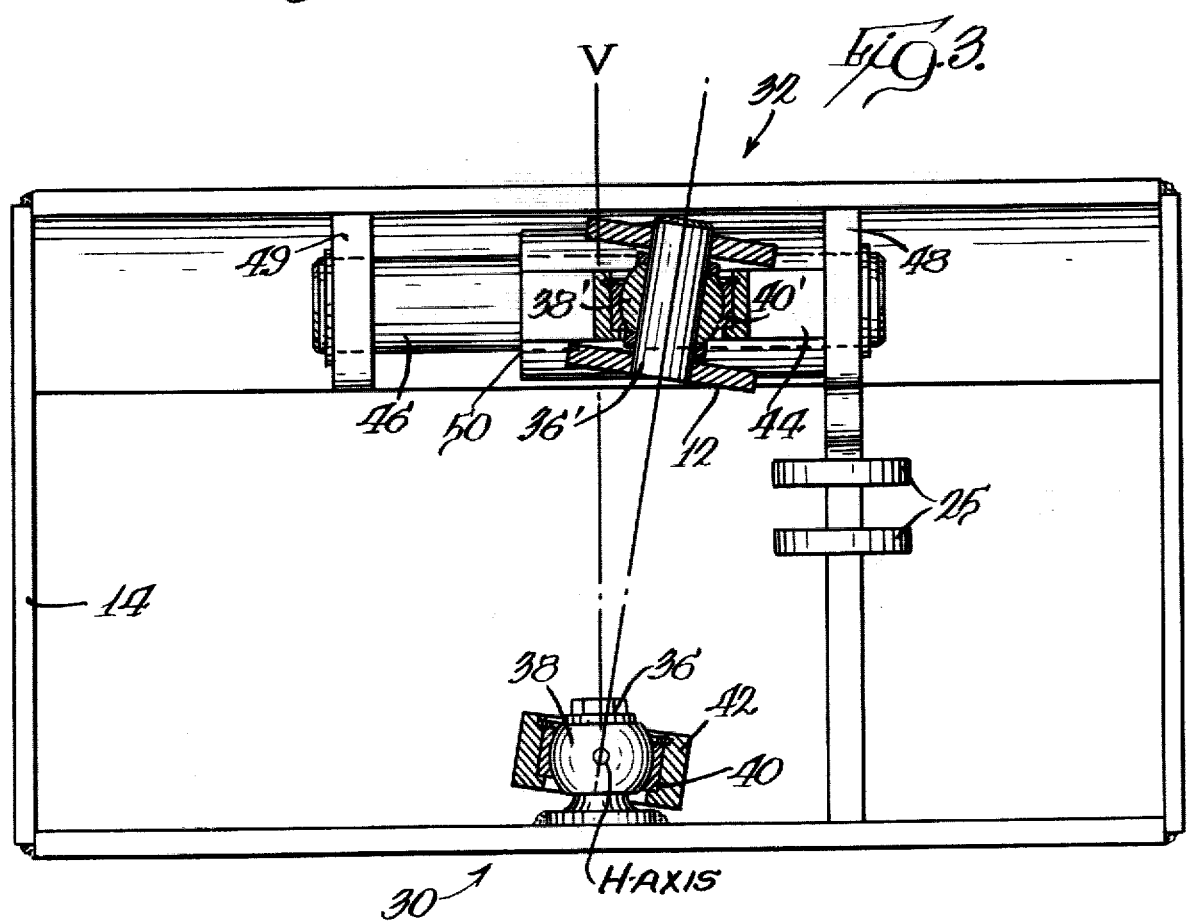

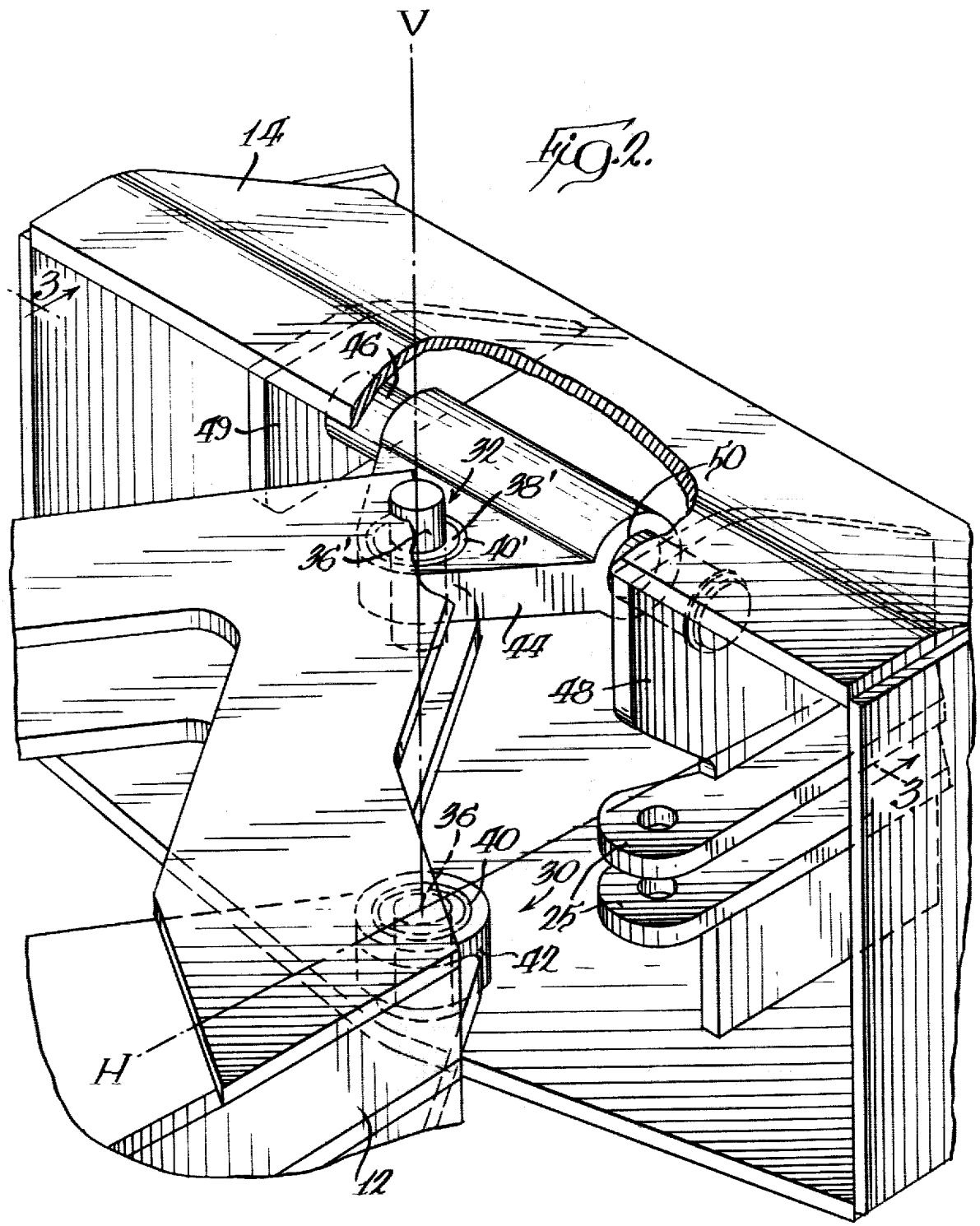

JOINT FOR ARTICULATED VEHICLES

DESCRIPTION

TECHNICAL FIELD

The present invention relates generally to articulated vehicles and more particularly to an articulated vehicle having two frame sections both of which sections have a pair of support wheels and a coupling or joint between the two sections or frames permitting relative rotation of the frames about both the horizontal and vertical axis.

BACKGROUND OF THE INVENTION

Vehicles of the type known as "articulated vehicles" or "articulated frame structures" currently enjoy widespread acceptance by the construction industry. Typically such vehicles are made in two sections, a front or forward unit and a rear or back unit. These two sections are joined by an articulated joint. Typical examples are described in U.S. Pat. No. 3,038,619; 3,912,300 and 4,154,456.

Articulated vehicles employing an articulated joint which accommodates relative pivotal movement between the two sections of the vehicle both with respect to a vertical axis and with respect to a horizontal axis have heretofore been highly complicated in design and therefore expensive to manufacture. Very often, complicated bearing structures were used which required frequent maintenance and which were subject to wear or breakage. Space was restricted and surrounding equipment could not interfere with the operation of the joint.

Specifically, the pivotal axis of the joint is relatively inaccessible and not readily visible. The joint is therefore frequently ignored from the standpoint of maintenance. This is even true though the joint is subject to substantial wear due to dirt and other contaminants entering therein.

Furthermore, since most of the control functions are of necessity located on the frame section with the material handling unit thereon, provision must be made for interconnecting these controls with the power plant. The power plant is usually located in the rear section to counterbalance the material handling unit. Power transfer is normally accomplished through hydraulic plumbing and electrical wiring. With a center articulated joint, it often becomes difficult to find adequate space for passing these connections between the two frame sections.

One highly successful and typical articulated vehicle of the type just described is described in U.S. Pat. No. 4,154,456 by Jensen et al. and assigned to the assignee of the present invention. One of the sections has an elongated guide channel that extends generally transversely of the longitudinal axis thereof with a support member movable along the guide channel. A first universal joint connection is provided between the support member and the other frame section while a second universal connection is provided directly between the two frame sections at a location spaced from the guide channel. Thus, the second universal connection not only provides a connection between the two frame sections that will accommodate pivotal movement about the vertical axis, but also defines a general, horizontal longitudinal pivot axis between the two frame sections.

More specifically, a channel member cooperates with the guide channel to maintain a U-shaped support member on the guide channel and also to define extreme limits of movement of the support member along the guide channel. Spacers are positioned between the guide channel and the channel member at opposite ends with bolts used to interconnect the two channels. The spacers not only maintain the predetermined clearance between the two channels, but also define extreme limits of movement along the guide channel. Wear plates are secured to opposite surfaces of the base portion of the U-shaped support bracket. These wear plates are ideally kept in continuous engagement with the adjacent surfaces of the two channels.

SUMMARY OF THE INVENTION

According to the present invention, an interconnection mechanism for joining two sections of an articulated vehicle is provided. This mechanism incorporates two spaced pivotal connections between the frame sections that can be spaced any desired dimension to reduce the load on the respective pivotal connections. One of the pivotal connections is movable transversely of the longitudinal axis to allow for oscillation of the vehicle about the horizontal, longitudinal axis.

The spaced apart pivotal connections leave the center joint area between the frame sections essentially free of all components requiring high maintenance or attention. In addition, the space is characterized by smoothly interfacing components, thus, facilitating the passage of hydraulic hoses and electrical cables or harnesses. The design also facilitates maintenance and resists accumulation of dirt and debris.

More specifically, the articulated vehicle of the present invention includes first and second frames that are interconnected for movement about a vertical axis and a horizontal axis extending generally longitudinally of the vehicle through an articulated joint. The joint includes a pair of spaced pivotal connections interconnecting the respective frames for pivotal movement about the one of two axes and at least one of the pivotal connections is movable along a plane extending through the first pivotal axis to accommodate oscillation of the frame sections about a generally longitudinal, horizontal axis.

In the specific embodiment of the invention, one of the sections of the vehicle has a combination guide and bearing means that extends generally transversely of the longitudinal axis thereof with a pivotal connection supporting member slidably and rotationally disposed thereon. The supporting member is free to move along the axis of a shaft. The supporting member carries with it a sleeve and seals. Together with the shaft, the supporting member defines a bearing. The seals provide a barrier against the entrainment of dirt and other foreign matter into the bearing.

The guide and bearing means is supported and attached to the vehicle section by a support and limit means. This is attached to both ends of the guide and bearing means. Consequently, it defines the limit of transverse travel of the supporting means by acting as a motion stop.

A first universal connection is provided between the supporting member and the other frame section while a second universal connection is provided directly between the two frame sections at a location spaced from the guide and bearing means. Thus, the vehicle accommodates pivotal movement about a horizontal and vertical axis allowing oscillation between the two frame sections within defined limits of oscillation.

BRIEF DESCRIPTION OF THE DRAWINGS

FIG. 1 is an illustration of an articulated vehicle having the coupling or joint of the present invention incorporated therein;

FIG. 2 is an enlarged, fragmentary perspective view of the joint or coupling;

FIG. 3 is an enlarged, cross-sectional view as viewed along line 3—3 of FIG. 2 showing rotation of the two frame sections about a horizontal-longitudinal axes.

DETAILED DESCRIPTION

While this invention is susceptible of embodiment in many different forms, there is shown in the drawings and will herein be described in detail the preferred embodiment of the invention with the understanding that the present disclosure is to be considered as an exemplification of the principals of the invention and is not intended to limit the invention to the embodiment illustrated.

Referring now to the drawings and in particular to FIG. 1, an articulated vehicle 10 is shown having a rear frame 12 and a front frame 14. The front and rear frames or sections 12 and 14 are interconnected by a coupling or joint, generally indicated by reference number 16.

Rear section or frame 12 is supported by a pair of rear wheels 18 which are attached to opposite ends of an axle 19 that is fixed to the rear frame section 12. The rear section 12 preferably incorporates a propulsion unit or engine (not shown) for propelling the vehicle 10 and for otherwise providing a source of fluid or mechanical power.

Front section 14 is likewise supported on a pair of wheels 20 (only one being shown) and has an operators cab 22 supported thereon. A material handling unit 24 is pivotally supported on the forward end of the front frame 14 in the well-known manner and thus a detailed description does not appear to be necessary. Articulation of the frame sections relative to each other is achieved by actuating a fluid ram 26 (partially shown) between the frame sections. Pivotal movement of the two frame sections will be about a vertical axis.

According to the present invention, coupling or joint 16 is constructed in a fashion to accommodate articulation of the frame sections about a vertical axis as well as oscillation of the frame sections about a generally horizontal axis. For this purpose, joint 16 includes first and second spaced pivotal connections 30 and 32 which pivotally interconnect the sections for pivotal movement about one axis, a vertical axis V, illustrated in FIG. 2. Also shown is a clevis 25 for joining to fluid ram 26 (See FIG. 1) to pivot the two sections of the vehicle.

The first or lower pivotal connection 30 defines a universal connection between the two frame sections. The second or upper pivotal connection 32 between the two frames is similar in construction to the lower pivotal connection 30.

For example, referring to the lower pivotal connection 30 shown on FIG. 3, it includes a pin 36 that has a spherical ball 38 fixedly supported intermediate opposite ends thereof and received into a socket 40 which is supported by an extension or ear 42 defined on the rear frame 12.

In the case of the upper pivotal connection 32, the spherical ball 38' is mounted axially along the pin 36' which is fixed to the rear frame 12. This feature will be explained at a later point in this discussion. In addition, the upper universal connection 32 is adapted to be moved transversely on the vehicle to accommodate pivotal movement of the frames 12 and 14 about a generally longitudinal axis. For this purpose, the ball 38' and socket 40' of the upper pivotal connection 32 is held by a support member or element 44 which itself is mounted for movement transversely of the longitudinal axis H of the vehicle.

The support element 44 is guided for movement along this path through a guide means 46. This is shown as a shaft extending between a pair of vertical plates 48 and 49 that form a part of the front frame 14.

The support element 44 is keyed or indexed to the shaft 46 for slidable and rotational movement thereon. A sleeve (not shown) is coaxially located relative to the shaft 46. The ends of the support element 44 contain seals 50 (only one side being shown) preventing the entrainment of foreign matter along the shaft as the support element moves thereon.

Furthermore, each of the two vertical plates 48 and 49 act in effect as "stops" limiting the pivotal movement or oscillation of the vehicle about a longitudinal axis. Thus, the plates 48 and 49 function as support and guide means relative to the shaft 46.

What is especially noteworthy about this design concept is the utilization of smooth interlocking components to minimize the otherwise confused mass of electrical cables and hydraulic hoses and other power components usually found in the vicinity of the articulated joint of the vehicle. The cylindrical shaft 46 and complementary sleeve (within support element 44) define a bearing surface. This bearing surface provides for a balanced transmission of forces between the two vehicle sections 12 and 14 without unduly loading anyone of the two pivotal connections 30 and 32. This allows free pivoting without overloading the two pivotal connections.

Thus, in operation, if the vehicle 10 passes over uneven terrain, the frame sections 12 and 14 can readily pivot about a longitudinal axis H to accommodate pivotal movement. As illustrated in FIG. 3, if the rear frame 12 is pivoted in a slightly clockwise direction, relative to the front frame 14 the rear frame support 42 will pivot about a horizontal axis H defined within the lower pivotal connection 30. During this pivotal movement, the support element 44 and is moved to the right along the shaft 46 until it hits the stop 48. The spherical ball 38' portion of the upper pivotal connection 32 rotates clockwise relative to its socket 40' and the ball 38' pivots downwardly and axially along the shaft 46. This is because the distance between the support 42 and pin 36' is fixed and because the ball 38' and socket 40' are constrained to move about and along the shaft 46. If one thinks of these two constraints as forming two sides of a right triangle, the third leg or hypotenuse must of necessity be greater in length than the other two legs. Therefore, the rear frame section 12 can be moved to the angular position illustrated in FIG. 3 while the front frame section 14 remains in a generally horizontal position so long as the socket 40' is free to move about and along the axis of the shaft 46'.

From the above description, it will be apparent that the present invention provides a simple, low-cost innovative joint between two articulated vehicle sections that can accommodate pivotal movement about two mutually perpendicular axes. The respective pivotal connections 30 and 32 can be vertically spaced any desired distance to provide a large open area along the center longitudinal axis of the vehicle and to reduce the load on each pivotal connection. In addition, the main components of the joint feature smoothly interlocking surfaces, thereby resisting the entrainment of foreign matter and reducing the fretting force applied to the various hoses and electrical cables passing between the two sections in the vicinity of the articulated joint.

From the foregoing it will be observed that numerous variations and modifications may be effected without departing from the true spirit and scope of the novel concept of the invention. It will be understood that no limitation with respect to the specific apparatus illustrated herein is intended or should be inferred. It is, of course, intended to cover by the appended claims all such modifications as fall within the scope of the claims.

What is claimed is as follows:

1. An articulated joint for an articulated vehicle having a front section and a rear section, comprising: two vertically spaced ball and socket connections interconnecting said sections for pivotal movement about a horizontal axis and a vertical axis, each ball and socket connection having a ball fixed to a pin which is carried by one of the front and rear sections, and a socket complementary to said ball which is carried by the other of said front and rear sections; and guide means, on said one section and disposed transversely relative to the longitudinal axis of said vehicle, for supporting the pin and ball of one of said ball and socket connections slidingly and rotationally about a horizontal axis, whereby relative pivotal movement of said sections in a horizontal plane about a vertical axis and in a vertical plane about a horizontal axis is accommodated by the oscillation of said ball and socket connections while said one ball and socket connection shifts transversely parallel to a horizontal axis and rotates through a vertical plane.

2. An articulated joint for an articulated vehicle having a wheel supported front section, and a wheel supported rear section, comprising: two spaced pivotal connections interconnecting said sections for pivotal movement about a vertical axis; and sliding means, supporting one of said pivotal connections horizontally along a first vertical plane and rotationally through a mutually perpendicular second vertical plane, for accommodating pivotal movement of said sections about a horizontal axis, said sliding means including a generally horizontal shaft attached to one of said sections by a shaft support which limits the horizontal movement of said one pivotal connection, said sliding means including a sleeve bearing disposed around said shaft and end seals to limit dirt from entering upon the bearing surfaces between said shaft and said sleeve bearing, said sleeve bearing transmitting force between said front and rear sections, thereby accommodating relative pivotal movement between said sections in a horizontal plane about a vertical axis and in a vertical plane about a horizontal axis.

3. An articulated joint for accommodating movement of the front and rear frames of a vehicle about a vertical axis and a horizontal axis, said horizontal axis extending generally longitudinally between the front and rear frames of the vehicle, comprising:
   (a) a first ball and socket connection between said front and rear frames;
   (b) a second ball and socket connection between said frames and spaced vertically from above said first connection, each of said first and second connections including a pin fixedly keyed to a spherical ball and a spherical socket receiving said ball, the pin of the first connection being joined to one of said vehicle frames with both sockets being joined to the other of said vehicle frames;
   (c) a smooth, horizontal, cylindrical shaft carried by one of said front and rear frames and extending transversely relative to the longitudinal axis of said front and rear frames;
   (d) sliding support means, slidingly and rotationally disposed along said shaft, for connecting the pin of said second connection to said one frame, said sliding means and said shaft cooperating together to define a bearing; and
   (e) fixed support means, joined to said one frame, for supporting said shaft and for defining extreme limits of horizontal movement of said sliding support means along said shaft, whereby relative pivotal movement of said frames in a horizontal plane about a vertical axis and in a vertical plane about a horizontal axis is accommodated by the oscillation of said fixed spherical balls within said sockets, the transverse movement of said sliding support means along said shaft, and the rotation of said sliding support means about said shaft, the rotation of said frames about the longitudinal axis of said vehicle being limited by said fixed support means.

4. The articulated joint as defined in claim 3, wherein said sliding support means defines a pair of shaft seals, said seals encompassing said shaft and precluding entry of foreign matter into said bearing.

* * * * *